US012472503B2

(12) United States Patent
Seo et al.

(10) Patent No.: US 12,472,503 B2
(45) Date of Patent: Nov. 18, 2025

(54) MODULAR TYPE MULTI-PLEX PCR APPARATUS

(71) Applicant: GENESYSTEM CO., LTD, Daejeon (KR)

(72) Inventors: Yujin Seo, Gyeonggi-do (KR); Woongseob Kim, Daejeon (KR); Junhee Park, Daejeon (KR); Wonjae Lee, Daejeon (KR)

(73) Assignee: GENESYSTEM CO., LTD., Daejeon (KR)

( * ) Notice: Subject to any disclaimer, the term of this patent is extended or adjusted under 35 U.S.C. 154(b) by 100 days.

(21) Appl. No.: 17/909,182

(22) PCT Filed: Apr. 7, 2022

(86) PCT No.: PCT/KR2022/005077
§ 371 (c)(1),
(2) Date: Sep. 2, 2022

(87) PCT Pub. No.: WO2022/255624
PCT Pub. Date: Dec. 8, 2022

(65) Prior Publication Data

US 2024/0246083 A1 Jul. 25, 2024

(30) Foreign Application Priority Data

May 30, 2021 (KR) ........................ 10-2021-0069619

(51) Int. Cl.
*B01L 7/00* (2006.01)

(52) U.S. Cl.
CPC ........... *B01L 7/52* (2013.01); *B01L 2300/027* (2013.01); *B01L 2300/043* (2013.01); *B01L 2300/0819* (2013.01); *B01L 2300/0861* (2013.01); *B01L 2300/1805* (2013.01); *B01L 2300/1844* (2013.01)

(58) Field of Classification Search
CPC ...... B01L 7/52; B01L 9/527; B01L 3/502715; B01L 2300/027; B01L 2300/043;
(Continued)

(56) References Cited

U.S. PATENT DOCUMENTS 7,767,439 B2 8/2010 Oh et al.
8,133,671 B2 * 3/2012 Williams ................ B01L 9/527 435/6.12
(Continued)

FOREIGN PATENT DOCUMENTS

CN 107043697 A 8/2017
JP 2011-234639 A 11/2011
(Continued)

OTHER PUBLICATIONS

Supplementary European Search Report for European Patent Application No. EP 22758113 dated Jun. 7, 2024, 7 pages.

*Primary Examiner* — Lessanework Seifu
(74) *Attorney, Agent, or Firm* — Fox Rothschild LLP

(57) ABSTRACT

The present disclosure relates to a modular simultaneous diagnosis PCR system, in which a plurality of seating grooves, in which biochips are seated, is formed in an upper surface of a single main body housing, a plurality of heating/cooling modules and a plurality of light source modules are installed in the main body housing so as to correspond to the seating grooves, a plurality of cover members including detection modules corresponding to the seating grooves is installed on an upper surface of the main body housing so as to be rotatable upward or downward, and a PCR inspection is simultaneously performed on samples accommodated in multiple biochips by controlling the plurality of heating/cooling modules, the plurality of light
(Continued)

source modules, and the plurality of detection modules in an integrated manner by using a single control module installed in the main body housing.

5 Claims, 16 Drawing Sheets

(58) Field of Classification Search
CPC ..... B01L 2300/0819; B01L 2300/0861; B01L 2300/1805; B01L 2300/1844; B01L 2300/025; B01L 2300/1827
See application file for complete search history.

(56) References Cited

U.S. PATENT DOCUMENTS

| | | | |
|---|---|---|---|
| 2006/0246580 | A1 | 11/2006 | Kim et al. |
| 2013/0078712 | A1 | 3/2013 | Sano et al. |
| 2016/0361719 | A1 | 12/2016 | Courtney |

FOREIGN PATENT DOCUMENTS

| | | | |
|---|---|---|---|
| KR | 10-2005-0056870 | A | 6/2005 |
| KR | 10-2010-0008476 | A | 1/2010 |
| KR | 10-1253455 | B1 | 4/2013 |
| KR | 10-2019-0095080 | A | 8/2019 |
| KR | 10-2021-0002317 | A | 1/2021 |
| WO | 2020/176816 | A1 | 9/2020 |

* cited by examiner

MODULAR TYPE MULTI-PLEX PCR APPARATUS

CROSS-REFERENCE TO RELATED APPLICATIONS

This application is a National Phase application filed under 35 USC 371 of PCT International Application PCT/KR2022/005077 with an International Filing Date of Apr. 7, 2022, which claims priority from Korean Application 10-2021-0069619 filed on May 30, 2021. The entire contents of these applications are incorporated herein by reference in their entirety.

TECHNICAL FIELD

The present disclosure relates to a polymerase chain reaction (PCR) apparatus, and more particularly, to a modular simultaneous diagnosis PCR system, in which a plurality of PCR modules may be installed in a single apparatus, and the plurality of PCR modules may be controlled by using a single control module.

RELATED ART

The polymerase chain reaction (PCR) is a technology of repeatedly heating and cooling a sample solution containing a nucleic acid molecule to replicate a site (target nucleic acid) having a specific nucleotide sequence in a chain and amplify the site exponentially. The PCR is a technology that can detect a target gene by amplifying and replicating a small amount of nucleic acid.

Such a PCR method repeatedly performs a DNA denaturing step, an annealing step, and a DNA extension step. The DNA denaturing step is a step of dividing double strands of DNA into a single strand of DNA by heating a sample solution containing double strands of template DNA for 5 seconds at a particular temperature, e.g., about 95° C. The annealing step is a step of forming a partial DNA-primer composite body by injecting a primer having a sequence complementary to a particular nucleotide sequence, which is to be amplified, into the sample solution after the DNA denaturing step and hybridizing the primer to the particular nucleotide sequence of the single strand of DNA by cooling the primer and the single strand of DNA for 5 seconds at a particular temperature, e.g., 50° C. The DNA extension step is a step of forming double strands of DNA based on the primer of the partial DNA-primer composite body by means of a DNA polymerase by maintaining the sample solution for 5 seconds at an activation temperature of the DNA polymerase, e.g., 72° C. after the annealing step. Further, the method may detect the target nucleic acid by detecting fluorescence generated by a fluorescent dye coupled to the target nucleic acid.

FIG. 1 is a schematic configuration of a PCR apparatus in the related art, and FIG. 2 is a view illustrating a state in which the PCR apparatus illustrated in FIG. 1 is used.

As illustrated, a PCR apparatus 100 in the related art broadly includes a main body housing 110, a PCR module 120, a control module 130, and a biochip 140.

The main body housing 110 serves to define an external appearance of the PCR apparatus 100, has a hexahedral shape, and has therein a space having a predetermined size. The PCR module 120 serves to heat and cool a reactant accommodated in the biochip 140 and has a rectangular parallelepiped shape. The PCR module 120 is installed to be accommodated in the main body housing 110 while sliding through an opening portion formed in a front surface of the main body housing 110.

The control module 130 is installed in the main body housing 110 and electrically connected to the PCR module 120. The control module 130 performs a predetermined PCR process by controlling the PCR module 120.

The biochip 140 has a plurality of chambers each configured to accommodate the reactant containing a sample and a reagent and is seated in a seating groove 122 formed in an upper surface of the PCR module 120. The biochip 140, together with the PCR module 120, is installed in the main body housing 110.

Further, the PCR module 120 includes therein a heating/cooling module 150 configured to heat or cool the biochip 140 seated on the seating groove 122, and a light source module 160 configured to emit light with a predetermined wavelength to a lateral surface of the biochip 140. The heating/cooling module 150 includes a heating plate 151, a heat dissipation block 153, and a heat dissipation fan 155. The light source module 160 includes a plurality of LEDs 161 and a filter 163.

In addition, a detection module 170 is installed in the main body housing 110 and positioned above the seating groove 122 of the PCR module 120. The detection module 170 serves to detect fluorescence radiated from the biochip 140 seated in the seating groove 122. The detection module 170 includes an image sensor 171 and a filter 173.

In addition, a display panel 180 is installed on an upper surface of the main body housing 110 and is rotatable upward or downward. The control module 130 includes a control unit 131 and a power source unit 133. Non-described reference numeral 135 indicates an air blower.

As described above, in the case of the PCR apparatus 100 in the related art, the single PCR module 120 is installed in the main body housing 110, and the control module 130 controls the PCR module 120 and the display panel 180. For this reason, the PCR apparatus 100 cannot simultaneously perform a PCR inspection on a plurality of samples. In addition, because the display panel 180 in the related art is installed on the upper surface of the main body housing 110 and structured to be rotatable upward or downward, there is a problem in that a large-area panel is hardly applied to the PCR apparatus, and the PCR apparatus is also structurally weak. In addition, because the control module 130 in the related art is structured to be fixed into the main body housing 110, there is a problem in that it is difficult to repair and replace the control module 130.

That is, multiple PCR apparatuses 100 need to be necessarily prepared to simultaneously perform the PCR inspection on the multiple samples by using the PCR apparatus in the related art. For this reason, there are problems in that costs required to purchase the apparatuses are increased, the process for the PCR inspection is complicated, and maintenance costs for the apparatuses are increased because the multiple PCR apparatuses 100 need to be used to perform the PCR inspection.

DETAILED DESCRIPTION OF THE PRESENT INVENTION

Technical Problem

The present disclosure has been made in an effort to solve the problems in the related art, and a main object of the present disclosure is to provide a modular simultaneous diagnosis PCR system capable of simultaneously performing a PCR inspection on a plurality of samples by using a single PCR system.

Another object of the present disclosure is to provide a modular simultaneous diagnosis PCR system, capable of simultaneously performing a PCR inspection performed on multiple samples by installing a plurality of PCR modules in a single main body housing, and by controlling a plurality of heating/cooling modules, a plurality of light source modules, a plurality of detection modules, and a plurality of display panels, which constitute the plurality of PCR modules, in an integrated manner by using a single control module installed in the main body housing, and capable of easily performing a process for PCR inspection by using a single PCR apparatus, reducing maintenance costs for the PCR apparatus, and greatly lowering product prices by eliminating duplicated components.

Still another object of the present disclosure is to provide a modular simultaneous diagnosis PCR system, capable of adopting a structurally stable and large-area panel by installing a display device on a front surface of the single PCR apparatus.

Means of Solving the Problem

To achieve the above-mentioned objects, the present disclosure provides a modular simultaneous diagnosis PCR system including: a main body housing configured to define an external appearance and having an internal space having a predetermined size; a plurality of biochips seated in a plurality of seating grooves concavely formed in an upper surface of the main body housing; a plurality of heating/cooling modules installed in the main body housing and positioned below the plurality of seating grooves, the plurality of heating/cooling modules being configured to heat or cool the biochips; a plurality of light source modules installed in the main body housing and positioned at lateral sides of the plurality of seating grooves, the plurality of light source modules being configured to emit light to lateral surfaces of the biochips; a plurality of cover members installed on the upper surface of the main body housing and configured to be rotatable upward or downward, the plurality of cover members each including a detection module positioned above the seating groove and configured to measure fluorescence emitted from the biochip; and a single control module installed in the main body housing and electrically connected to the plurality of heating/cooling modules, the light source modules, and the detection modules, the single control module being configured to control the plurality of heating/cooling modules, the light source modules, and the detection modules.

In the present disclosure, a display panel may be further installed on a front surface of the main body housing and be configured to be rotatable upward or downward, and the display panel may be electrically connected to the control module.

The upper surface of the main body housing may have a stepped portion having a predetermined height and formed at a center of the upper surface of the main body housing so that the upper surface of the main body housing has a stair shape, a lower end upper plate may be installed at a front side of the stepped portion, an upper end upper plate may be installed at a rear side of the stepped portion, the plurality of cover members may be installed on the lower end upper plate and the upper end upper plate and may be configured to be rotatable upward or downward.

A link member may be configured to support the display panel so that the display panel is rotatable, an opening portion having a predetermined size may be formed in a front plate of the main body housing so that the link member enters or exits the main body housing, and an opening portion having a predetermined size may be formed in a rear plate of the main body housing so that the control module is accommodated in the main body housing while sliding forward or rearward.

A plurality of opening portions may be formed in an upper plate of the main body housing and correspond to the plurality of seating grooves, a seating plate may be installed on a lower portion of the opening portion and have a through-hole formed at a center of the seating plate to define the seating groove, a support plate may be configured to support the heating/cooling module and fixedly installed on a lower portion of the seating plate, a hinge member may be vertically installed on an upper surface of a rear end of the support plate and configured to support the cover member so that the cover member is rotatable upward or downward, horizontal fixing shafts may be installed on left and right upper surfaces of the support plate and configured to fix the cover members, and the light source module may be installed on the seating plate and positioned at the lateral side of the seating groove.

The cover member may include: a casing configured to define an internal space having a predetermined size and having a through portion formed in a bottom surface of the casing and corresponding to the seating groove; and a handle having a 'ㄷ' shape and installed on a front surface and two opposite left and right sides of the casing, an installation groove may be formed at a rear end of the casing, and the rotary member may be installed in the installation groove.

The detection module may be installed in the cover member and positioned above the seating groove, and an LED display unit may be installed forward of the seating groove and configured to transmit light to an upper surface of the cover member.

The LED display unit may include: an LED board having a plurality of LEDs horizontally arranged; a light guide plate having at least four reflective surfaces, made of a transparent material, and configured to transmit upward light, which is radiated from the LED board, through the plurality of reflective surfaces; and a base configured to support the LED board and the light guide plate and fix the LED board and the light guide plate to a bottom surface of the cover member.

Center grooves may be formed in inner surfaces of two opposite ends of the handle, and rotary shafts may protrude from an outer surface of the cover member and be inserted into the center grooves, such that the handle is rotatable about the center grooves, the horizontal fixing shafts may be installed on an upper surface of the support plate, protrude to the upper surface of the main body housing, and be inserted into and moved in guide grooves, the guide groove may be opened downward when the handle rotates upward and vertically stands, and the guide groove may perform a locking function of fixing the horizontal fixing shaft so that the horizontal fixing shaft is not separated when the handle rotates downward and lies horizontally.

A hinge may be installed at an upper end of the front surface of the main body housing and allow the display panel to be rotatable upward or downward. The link member may include: two fixing blocks fixed to a bottom of the main body housing and spaced apart from one another at predetermined intervals; two lower link members installed on a lower horizontal fixing shaft horizontally penetrating the two fixing blocks and configured to be rotatable upward or downward; two upper link members installed on an intermediate horizontal fixing shaft horizontally penetrating upper ends of the two lower link members and configured to be rotatable upward or downward; and two fixing brackets installed on an upper end horizontal fixing shaft horizontally penetrating upper ends of the two upper link members and configured to be rotatable upward or downward, the two fixing brackets being fixed to a rear surface of the display panel.

The plurality of heating/cooling modules, the plurality of light source modules, the plurality of detection modules, and the plurality of display panels may be controlled by the single control module.

SUMMARY

According to the modular simultaneous diagnosis PCR system according to the present disclosure, the plurality of seating grooves, in which the biochips are seated, may be formed in the upper surface of the single main body housing, the plurality of heating/cooling modules and the plurality of light source modules are installed in the main body housing so as to correspond to the seating grooves, the plurality of cover members including the detection modules corresponding to the seating grooves may be installed on the upper surface of the main body housing so as to be rotatable upward or downward, and the PCR inspection may be simultaneously performed on the samples accommodated in the multiple biochips by controlling the plurality of heating/cooling modules, the plurality of light source modules, and the plurality of detection modules in an integrated manner by using the single control module installed in the main body housing, such that the plurality of PCR processes may be conveniently performed, the maintenance costs may be reduced, and the product prices may be lowered by eliminating the duplicated components.

DETAILED DESCRIPTION

Hereinafter, exemplary embodiments according to the present disclosure will be described with reference to the accompanying drawings. The present embodiment is for illustrative purposes and does not limit the present disclosure in any way.

Figure 1:
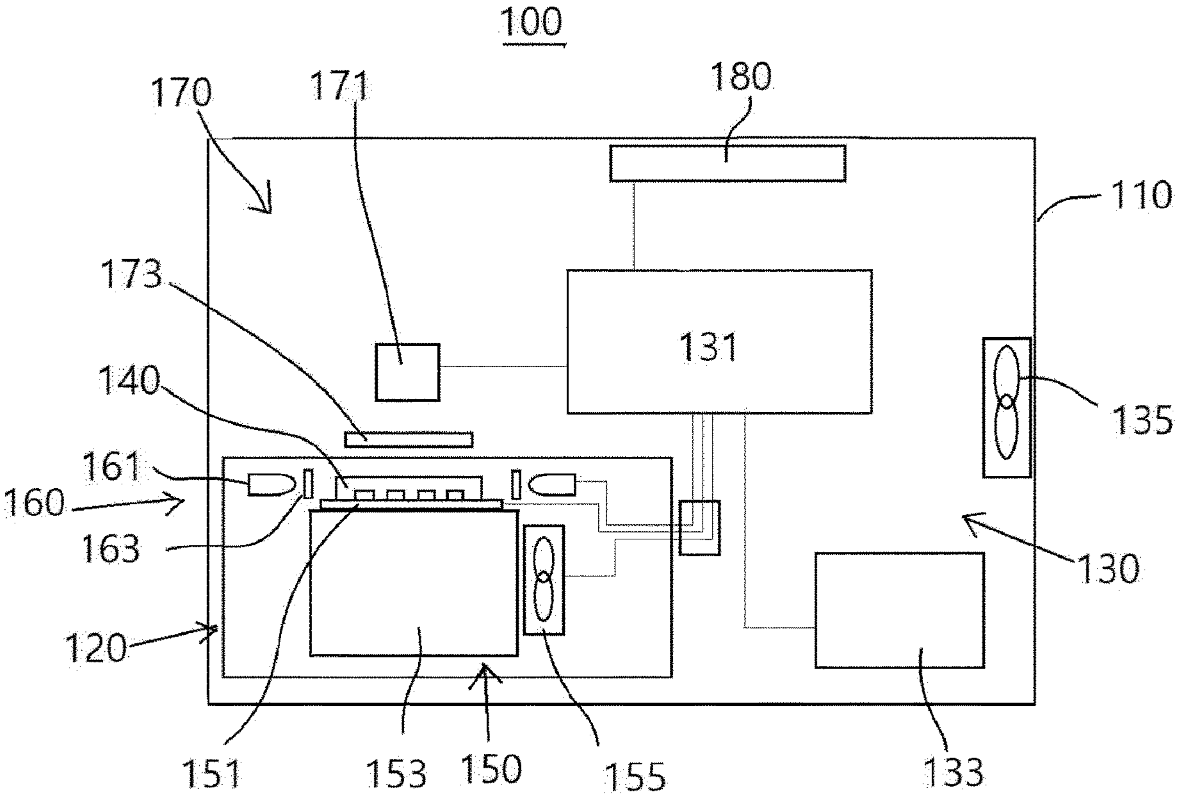
FIG. 1 is a schematic configuration view of a portable PCR apparatus in the related art.
Figure 2:
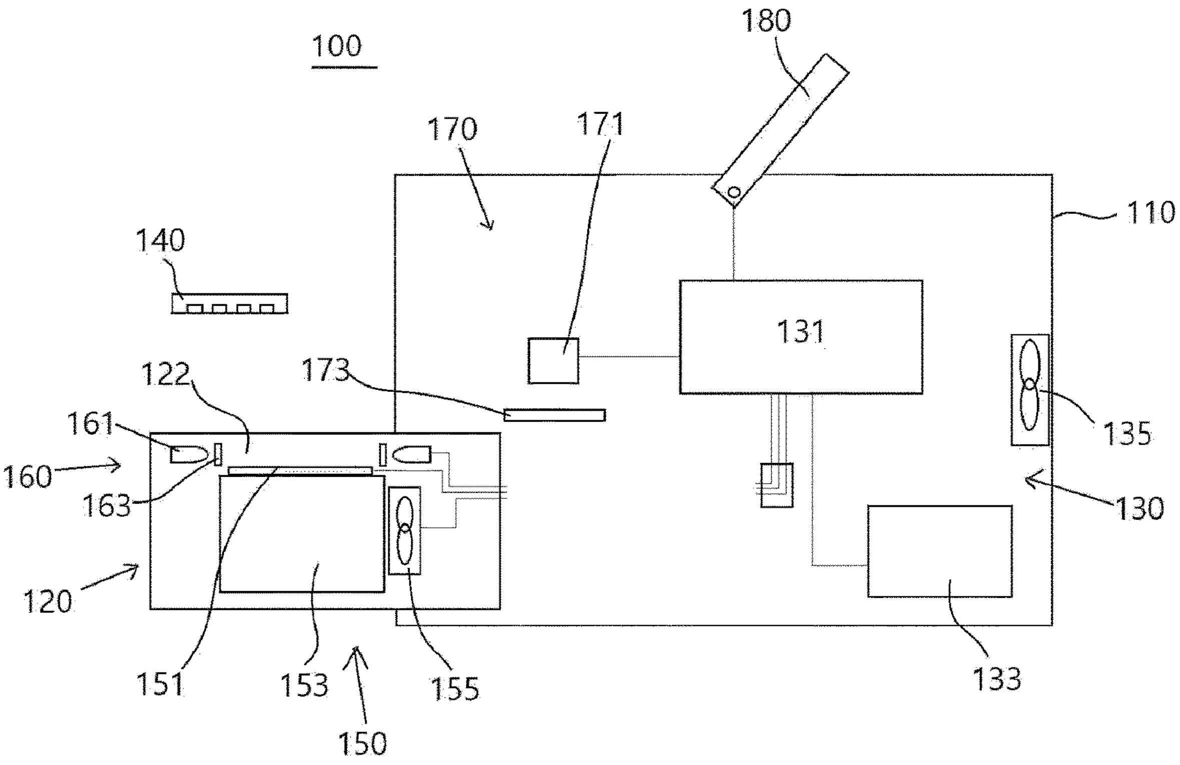
FIG. 2 is a configuration view illustrating a state in which the portable PCR apparatus in the related art illustrated in FIG. 1 is used.
Figure 3:
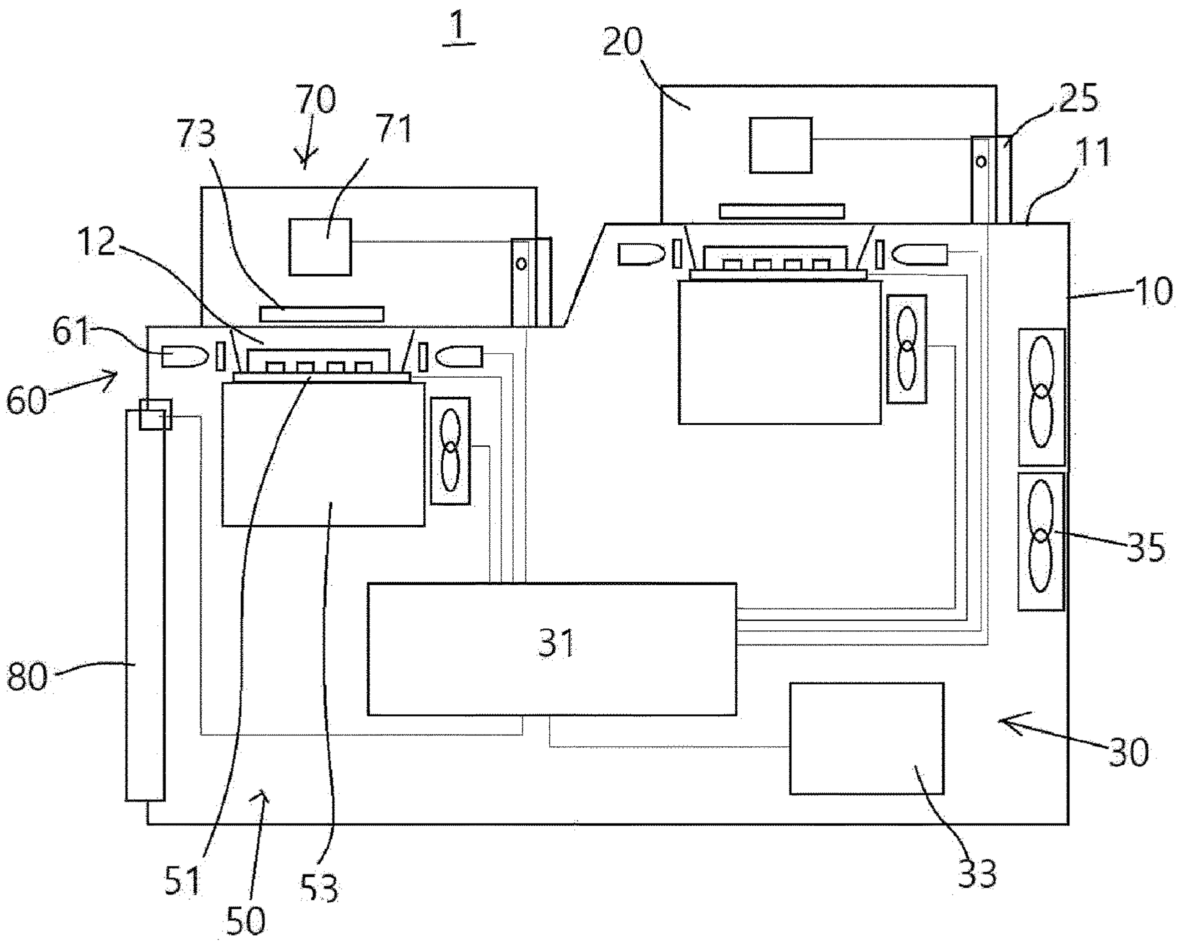
FIG. 3 is a schematic configuration view of a modular simultaneous diagnosis PCR system according to the present disclosure.
Figure 4:
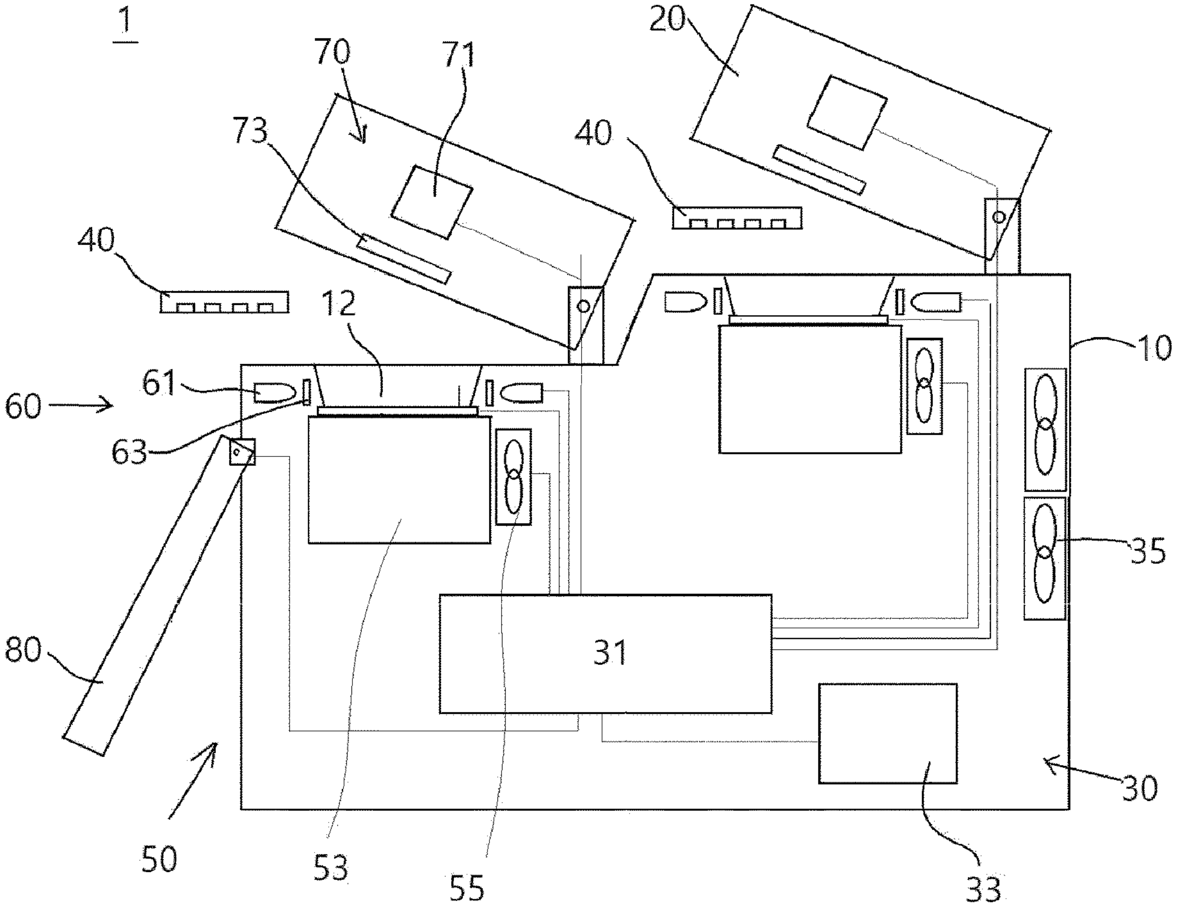
FIG. 4 is a configuration view illustrating a state in which the modular simultaneous diagnosis PCR system illustrated in FIG. 3 is used.

FIG. 3 is a schematic configuration view of a modular simultaneous diagnosis PCR system according to the present disclosure, and FIG. 4 is a view illustrating a state in which the modular simultaneous diagnosis PCR system illustrated in FIG. 3 is used.

As illustrated, a modular simultaneous diagnosis PCR system 1 according to the present disclosure includes: a main body housing 10 configured to define an external appearance and having an internal space having a predetermined size; and a plurality of biochips 40 seated in a plurality of seating grooves 12 formed in an upper surface of the main body housing 10.

Further, a plurality of heating/cooling modules 50 is installed in the main body housing 10 and positioned below the plurality of seating grooves 12 so as to correspond to the plurality of seating grooves 12. A plurality of light source modules 60 is installed at lateral sides of the seating grooves 12 so as to correspond to the seating grooves 12.

In addition, a plurality of cover members 20 is installed on the upper surface of the main body housing 10 and positioned above the plurality of seating grooves 12 so as to correspond to the plurality of seating grooves 12. The plurality of cover members 20 is configured to be rotatable upward or downward. Detection modules 70 are installed in the cover member 20 and positioned above the plurality of seating grooves 12 so as to correspond to the plurality of seating grooves 12.

In addition, a single control module 30 is installed in the main body housing 10. The control module 30 is electrically connected to the plurality of heating/cooling modules 50, the light source modules 60, and the detection modules 70 and controls the heating/cooling modules 50, the light source modules 60, and the detection modules 70.

Further, a display panel 80 is installed on a front surface of the main body housing 10. The display panel 80 is electrically connected to the control module 30 and configured to be rotatable upward or downward.

Specifically, the main body housing 10 has a hexahedral structure made of plastic and metal and includes a lower plate configured to define a bottom surface, two side plates configured to define two opposite lateral surfaces, an upper plate 11 configured to define an upper surface, a front plate configured to define a front surface, and a rear plate configured to define a rear surface.

In particular, the upper plate 11 has a stepped portion having a predetermined height and formed at a center of the upper plate 11 so that the upper plate 11 has a stair shape. A lower end upper plate 11*a* is installed at a front side of the stepped portion, and an upper end upper plate 11*b* is installed at a rear side of the stepped portion.

Opening portions each having a predetermined size are formed in the upper plate 11 so as to correspond to the plurality of seating grooves 12 so that the biochip 40 may pass through the opening portion. The heating/cooling module 50 is installed below the opening portion.

The heating/cooling module 50 includes a heating plate 51, a heat dissipation block 53, and a heat dissipation fan 55. The heating plate 51 is configured as a flat plate having a predetermined thickness and defines a bottom surface of the seating groove 12. The heating plate 51 heats or cools the biochip 40 on the heating plate 51 by generating heat or cold air when predetermined power is supplied to the heating plate 51. The heat dissipation block 53 having a plurality of heat radiating fins is installed below the heating plate 51. Further, the heat dissipation fan 55 is vertically installed rearward of the heat dissipation block 53.

The biochip 40 is configured as a board sized to enable the biochip 40 to be seated in the seating groove 12. The biochip 40 is made of a transparent material that transmits light well. The biochip 40 has a plurality of chambers configured to accommodate therein reactants containing reagents and samples. Particularly, a bottom surface of the biochip 40 may be configured as a thin sealing film that transfers heat excellently.

The light source module 60 is installed at the lateral side of the seating groove 12 and emits light to the lateral surface of the biochip 40 seated in the seating groove 12 so that the emitted light passes through the plurality of chambers. The filter 63 may transmit only light with a particular wavelength.

The cover member 20 serves to cover the seating groove 12 formed in the upper surface of the main body housing 10. The cover member 20 opens the seating groove 12 by rotating upward when the biochip 40 is inserted into or separated from the seating groove 12. The cover member 20 closes an upper side of the seating groove 12 by rotating downward when a PCR process is performed on the biochip 40 seated in the seating groove 12.

The cover member 20 includes a casing 21 sized to fully cover the seating groove 12, and a hinge member 25 configured to support the casing 21 so that the casing 21 is rotatable upward or downward relative to the main body housing 10.

Further, the detection module 70 is installed in the cover member 20. The detection module 70 is positioned above the seating groove 12 so that the detection module 70 may detect fluorescence radiated from the biochip 40 when the cover member 20 rotates toward the upper surface of the main body housing 10.

The display panel 80 serves to show a PCR process or a result of the PCR process. The display panel 80 is installed on the front surface of the main body housing 10 and configured to be rotatable forward or rearward. Further, the control module 30 is installed in the main body housing and electrically connected to the plurality of heating/cooling modules 50, the plurality of light source modules 60, the plurality of detection modules 70, and the single display panel 80.

As described above, in the modular simultaneous diagnosis PCR system 1 of the present disclosure, the plurality of seating grooves 12 is formed in the upper surface of the single main body housing 10 and spaced apart from one another so that the plurality of biochips 40 is seated in the plurality of seating grooves 12. The plurality of heating/cooling modules 50 is installed in the main body housing 10 and positioned below the plurality of seating grooves 12 so as to correspond to the plurality of seating grooves 12. The plurality of light source modules 60 is installed at the lateral sides of the plurality of seating grooves 12. The plurality of cover members 20 is installed on the upper surface of the main body housing 10 so as to correspond to the plurality of seating grooves 12 and configured to be rotatable upward or downward. The detection modules 70 are installed in the cover members 20 and positioned above the plurality of seating grooves 12 so as to correspond to the plurality of seating grooves 12. The plurality of heating/cooling modules 50, the plurality of light source modules 60, and the plurality of detection modules 70 are controlled in an integrated manner by the single control module 30 installed in the main body housing 10.

Figure 5:
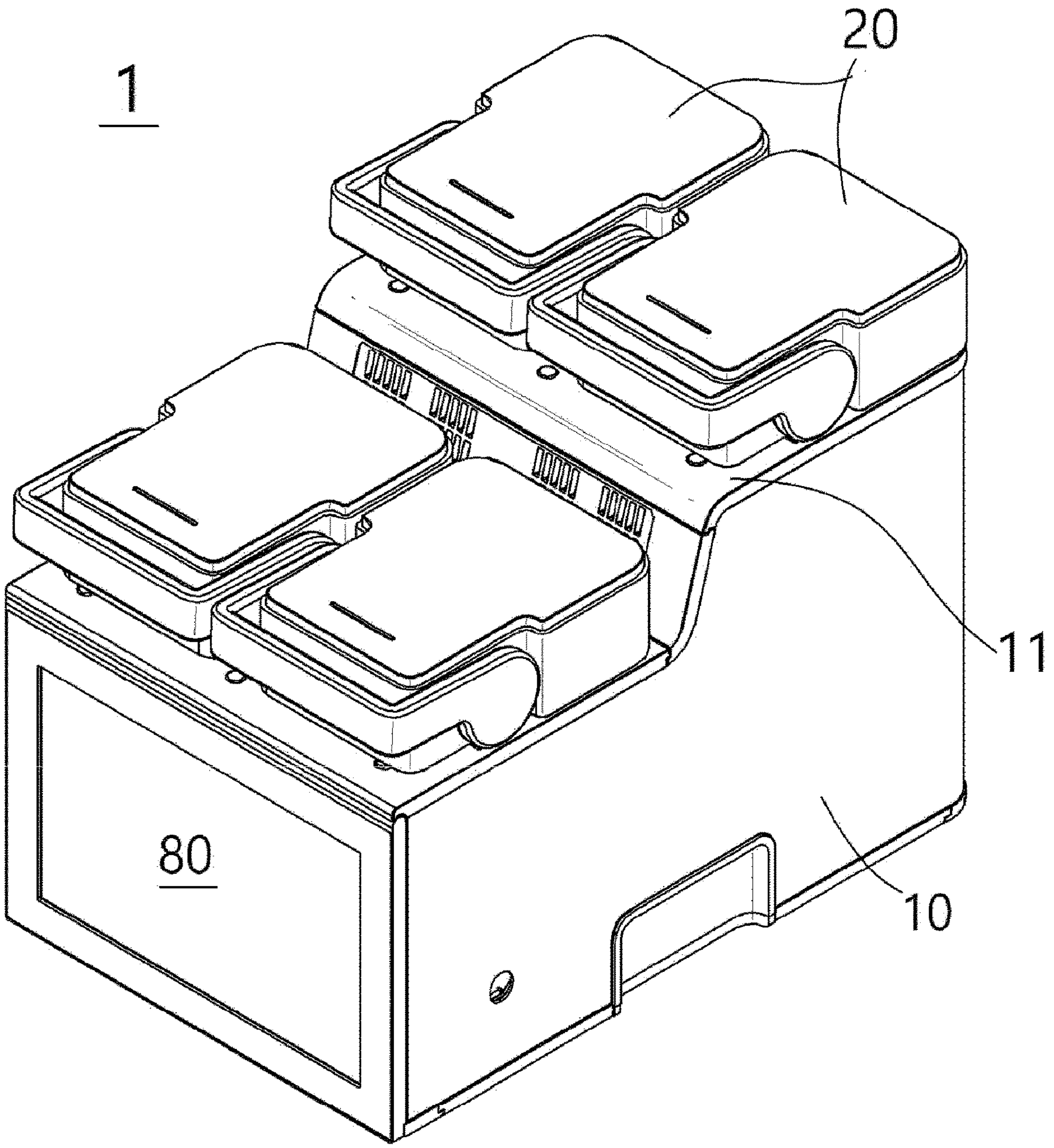
FIGS. 5 and 6 are perspective views illustrating exemplary embodiments of the modular simultaneous diagnosis PCR system according to the present disclosure.
Figure 6:
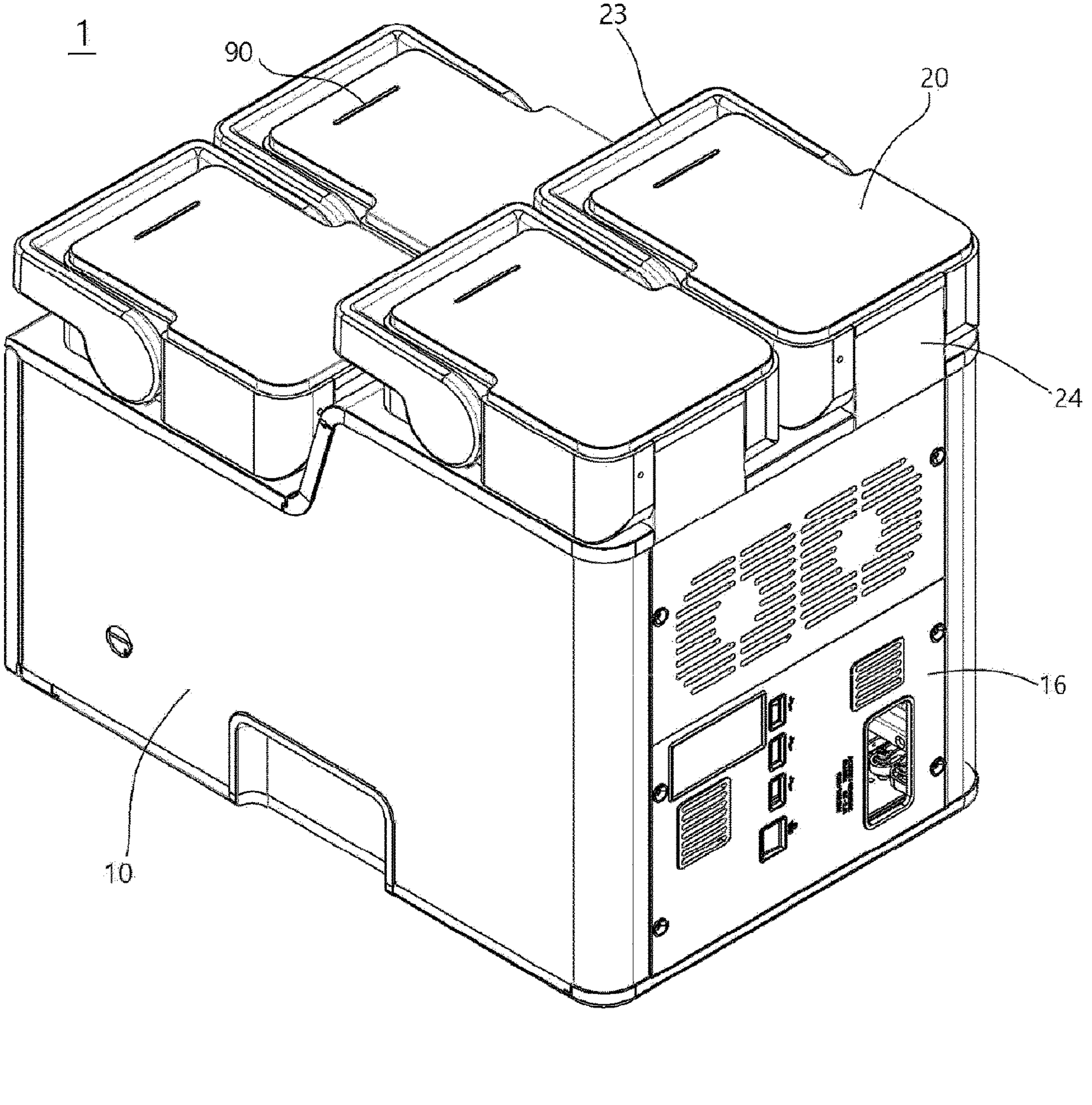
Figure 7:
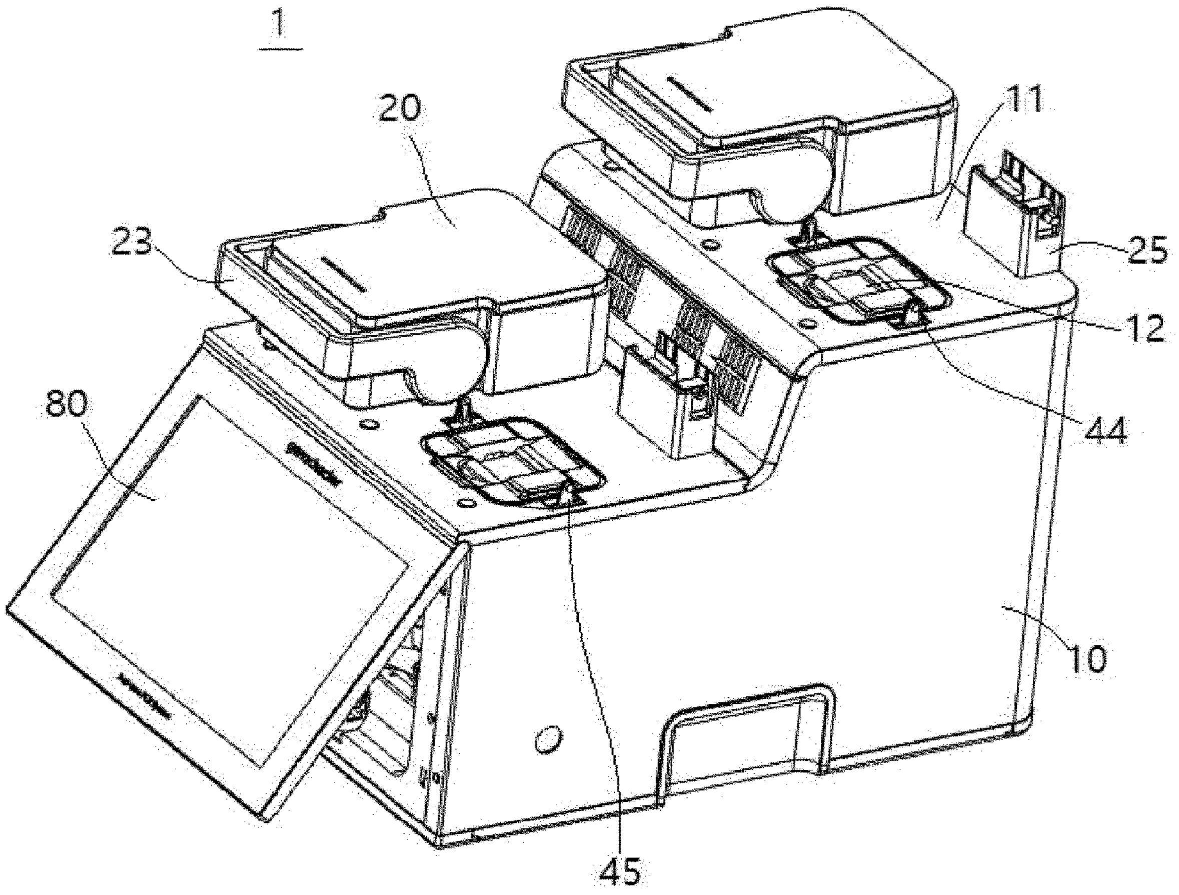
FIG. 7 is a perspective view illustrating a state in which a partial cover member is separated, and a display panel is rotated in the modular simultaneous diagnosis PCR system illustrated in FIG. 5.
Figure 8:
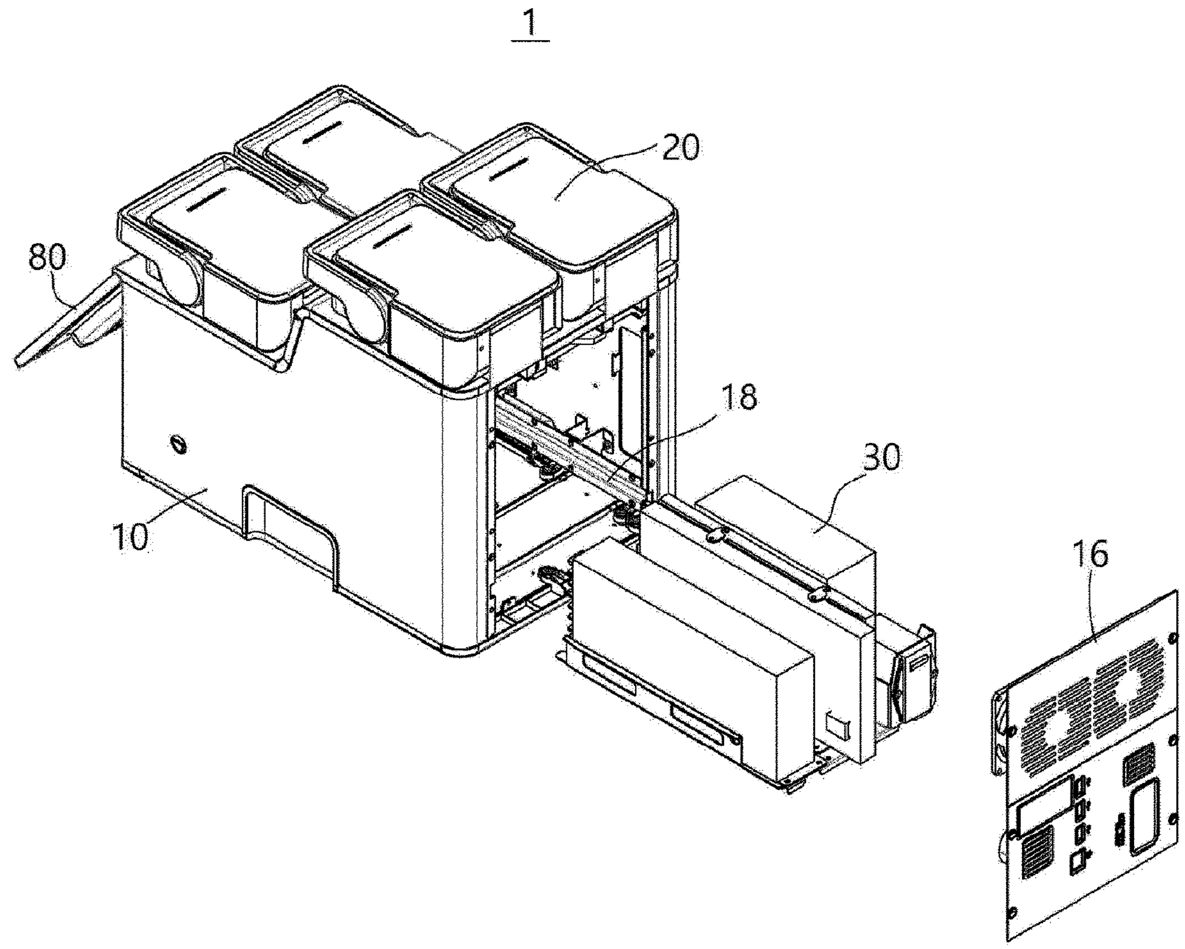
FIG. 8 is a perspective view illustrating a state in which a control module is separated from the modular simultaneous diagnosis PCR system illustrated in FIG. 6.

FIGS. 5 and 6 are perspective views illustrating exemplary embodiments of the modular simultaneous diagnosis PCR system according to the present disclosure, FIG. 7 is a perspective view illustrating a state in which a partial cover member is separated, and the display panel is rotated in the modular simultaneous diagnosis PCR system illustrated in FIG. 5, and FIG. 8 is a perspective view illustrating a state in which the control module is separated from the modular simultaneous diagnosis PCR system illustrated in FIG. 6.

As illustrated, the modular simultaneous diagnosis PCR system according to the present embodiment includes the main body housing 10 having a hexahedral shape, the plurality of cover members 20 installed on the upper surface of the main body housing 10 and spaced apart from one another at predetermined intervals, and the display panel 80 installed on the front surface of the main body housing 10.

Based on the stepped portion provided at the center of the upper surface of the main body housing 10, the upper surface of the main body housing 10 is divided into the lower end upper plate 11*a* and the upper end upper plate 11*b*, the two cover members 20 are installed on the lower end upper plate 11*a*, and the two cover members 20 are installed on the upper end upper plate 11*b*. In this case, a handle 23 is installed on a front surface of each of the cover members 20.

As illustrated in FIG. 6, an opening portion having a predetermined size is formed in a rear surface of the main body housing 10, and a rear cover plate 16 is detachably installed in the opening portion. In this case, a connector capable of connecting various types of cables is provided on the rear cover plate 16. Therefore, the control module 30 may be easily separated from the main body housing 10 as the rear cover plate 16 is separated. In this case, a guide rail 18 configured to guide the control module 30 is provided in the main body housing 10.

As illustrated in FIG. 7, the plurality of seating grooves 12 is formed in the upper surface 11 of the main body housing 10 so that the biochips 40 may be seated in the plurality of seating grooves 12. Further, the hinge member 25 is vertically installed rearward of the seating groove 12 and supports the cover member 20 so that the cover member 20 is rotatable upward or downward. In addition, locking members 45 are vertically installed at two opposite left and right sides of the seating groove 12 and each include a horizontal fixing shaft 44 that allows a user to fix the cover member 20 to the main body housing 10 by using the handle 23.

Figure 9:
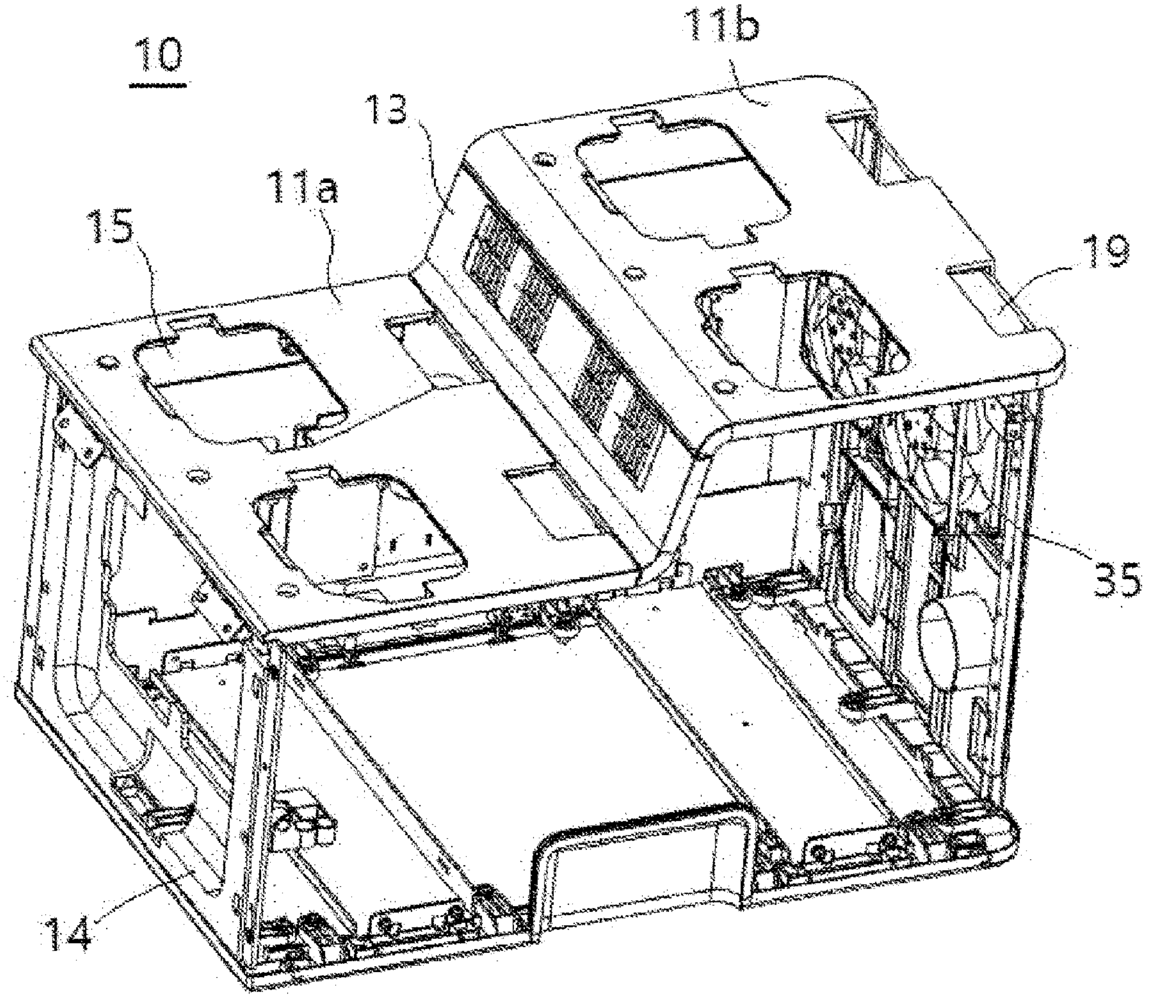
FIG. 9 is a perspective view illustrating an exemplary embodiment of a main body housing according to the present disclosure.

FIG. 9 is a view illustrating an exemplary embodiment of the main body housing 10 according to the present disclosure. The opening portion 14 is formed in the front surface of the main body housing 10 so that a link member 85 enters or exits the main body housing 10. The link member 85 supports the display panel 80 so that the display panel 80 is rotatable. In addition, four through portions 15 are formed in the upper surface of the main body housing 10 and serve to define the seating grooves 12. Four through-holes 19 are formed rearward of the through portions 15 to install the four hinge members 25. A plurality of ventilation ports is formed in the stepped portion 13 formed at a center of the upper plate 11.

Figure 10:
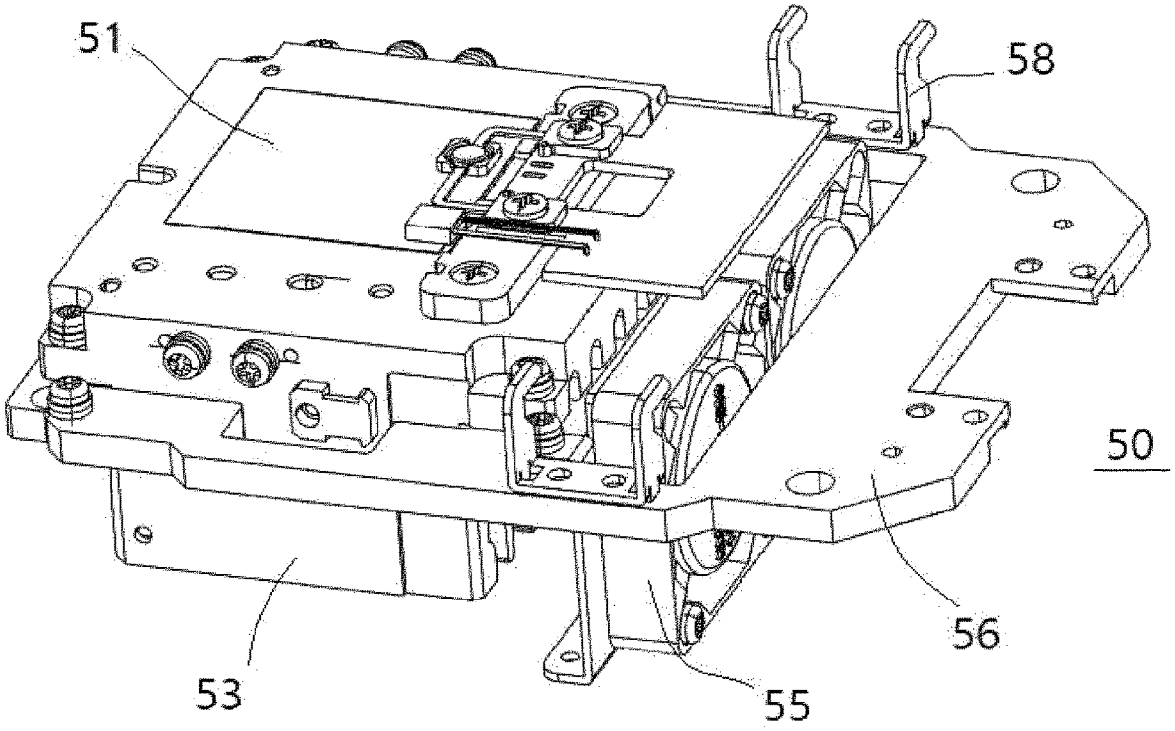
FIG. 10 is a perspective view illustrating an exemplary embodiment of a heating/cooling module according to the present disclosure.

Next, FIG. 10 is a perspective view illustrating an exemplary embodiment of the heating/cooling module 50 according to the present disclosure. As illustrated, the heating/cooling module 50 includes a support plate 56 coupled to a lower portion of the upper plate 11 of the main body housing 10. A through portion is formed at a center of the support plate 56, and the heat dissipation block 53 and the heat dissipation fan 55 are installed in the through portion. Coupling brackets 58 are vertically installed on an upper surface of the support plate 56 and provided at two opposite left and right sides of the support plate 56, and the coupling brackets 58 are coupled to the upper plate 11.

Further, the heating plate 51 having a predetermined size is horizontally installed on an upper surface of the heat dissipation block 53 installed on the support plate 56. In addition, a power source connection unit and a printed circuit board are installed at one side of the heating plate 51. Further, the heat dissipation fan 55 is vertically installed rearward of the heat dissipation block 53.

Figure 11:
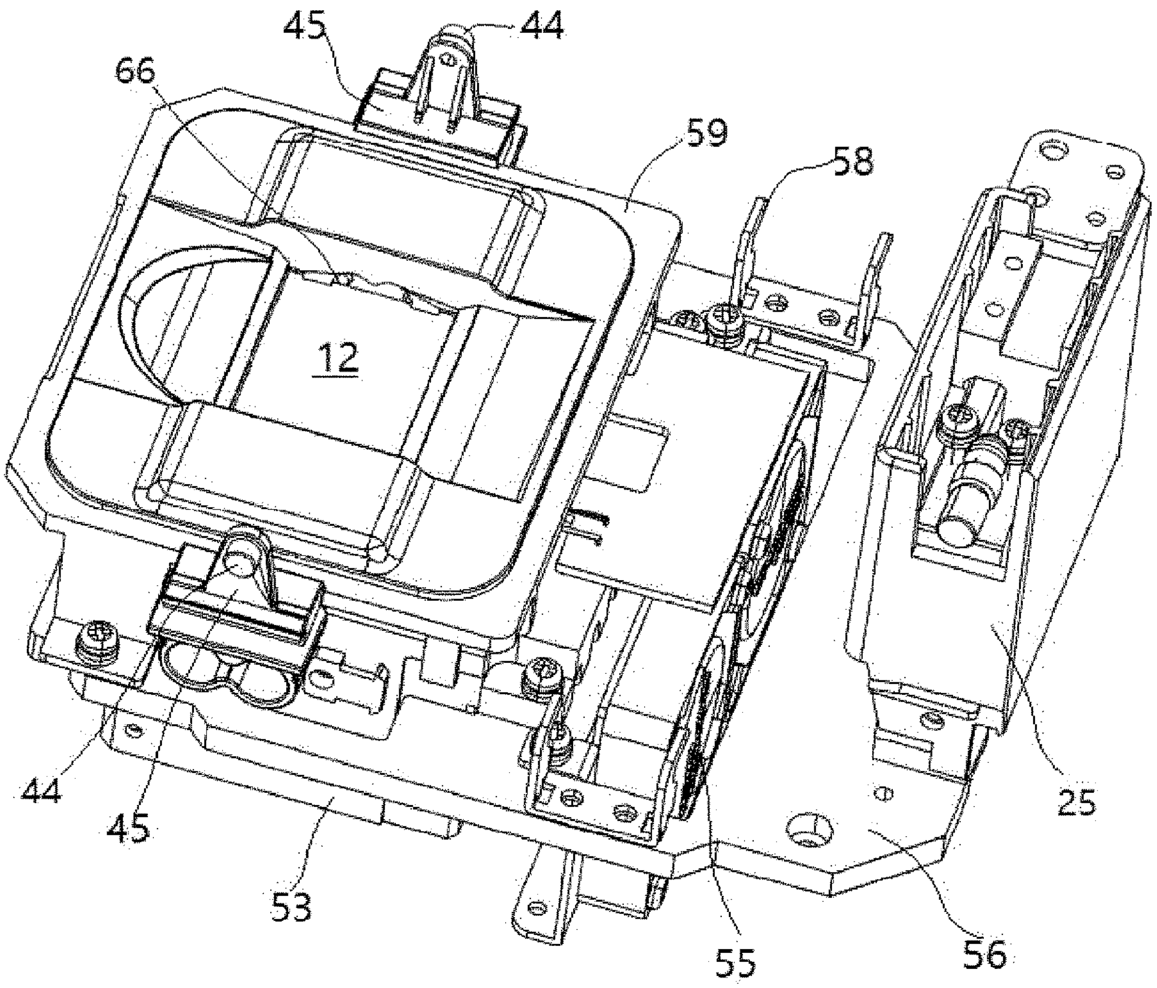
FIG. 11 is a perspective view illustrating a state in which a seating plate is installed on an upper portion of the heating/cooling module illustrated in FIG. 10.

Next, FIG. 11 is a perspective view illustrating a state in which a seating plate 59 is installed on an upper portion of the heating/cooling module 50 according to the present disclosure. The seating plate 59 is made of plastic, and a through-hole is formed at a center of the seating groove plate so that the biochip 40 may penetrate the through-hole. Further, the locking members 45 having the horizontal fixing shafts 44 for fixing the cover member 20 are installed at two opposite left and right sides of the seating plate 59. In addition, installation grooves 66 are horizontally formed at two opposite left and right sides of the seating groove 12 and used to install a light source module 60. Further, the hinge member 25 is vertically installed on an upper surface at a rear end of the support plate 56 and supports the cover member 20 so that the cover member 20 is rotatable upward or downward.

Figure 12:
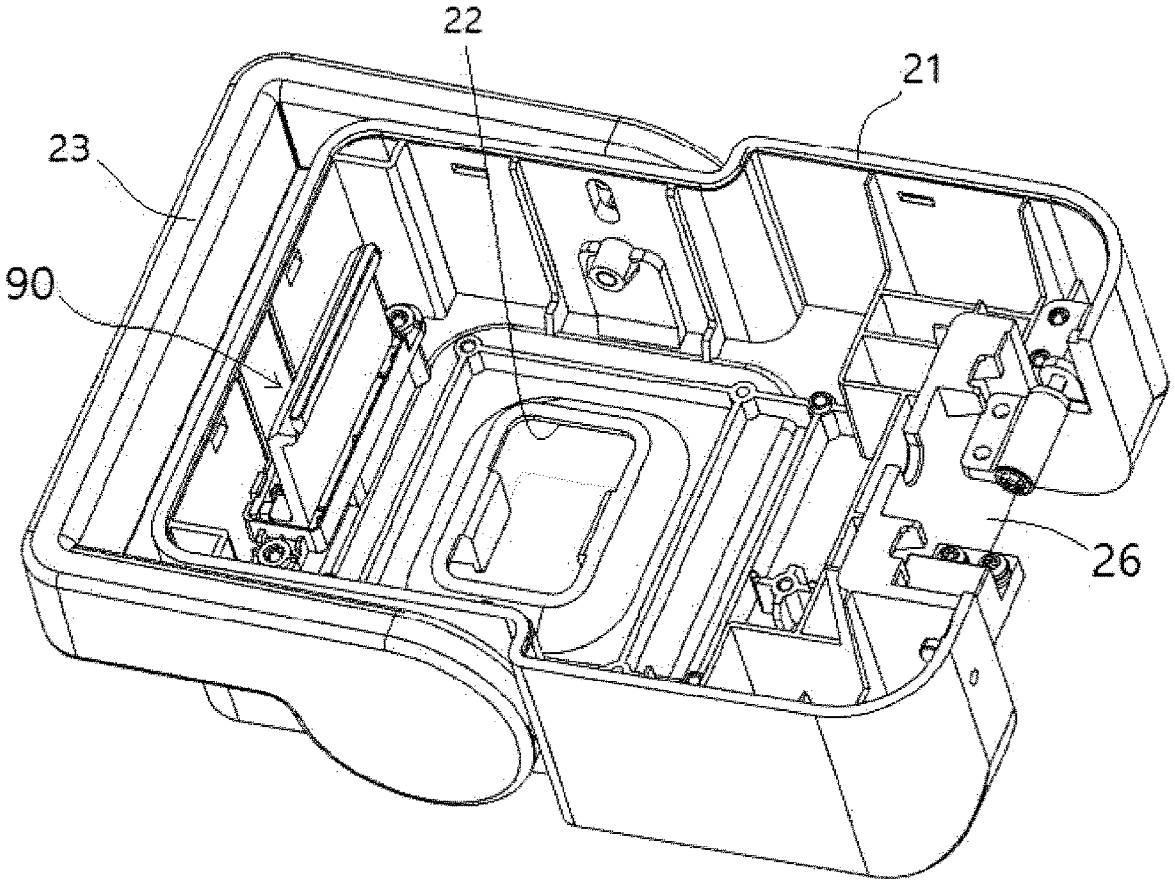
FIG. 12 is a perspective view illustrating an internal structure of a cover member according to the present disclosure.

Next, FIG. 12 is a perspective view illustrating an internal structure of the cover member according to the present disclosure. As illustrated, the cover member 20 includes the casing 21 having an internal space having a predetermined size, and the casing 21 includes the handle 23 configured to surround the front surface and a part of each of the lateral surfaces of the casing 21. The handle 23 is configured to be rotatable upward or downward or has a 'ㄷ' shape. A through-hole 22 is formed in a bottom of the casing 21 and corresponds to the seating groove 12. The non-illustrated image sensor 71 and the filter 73 are installed above the through-hole 22. Further, the LED display unit 90 is vertically installed forward of the through-hole 22. Non-described reference numeral 26 indicates an installation groove in which the hinge member 25 is installed.

Figure 13:
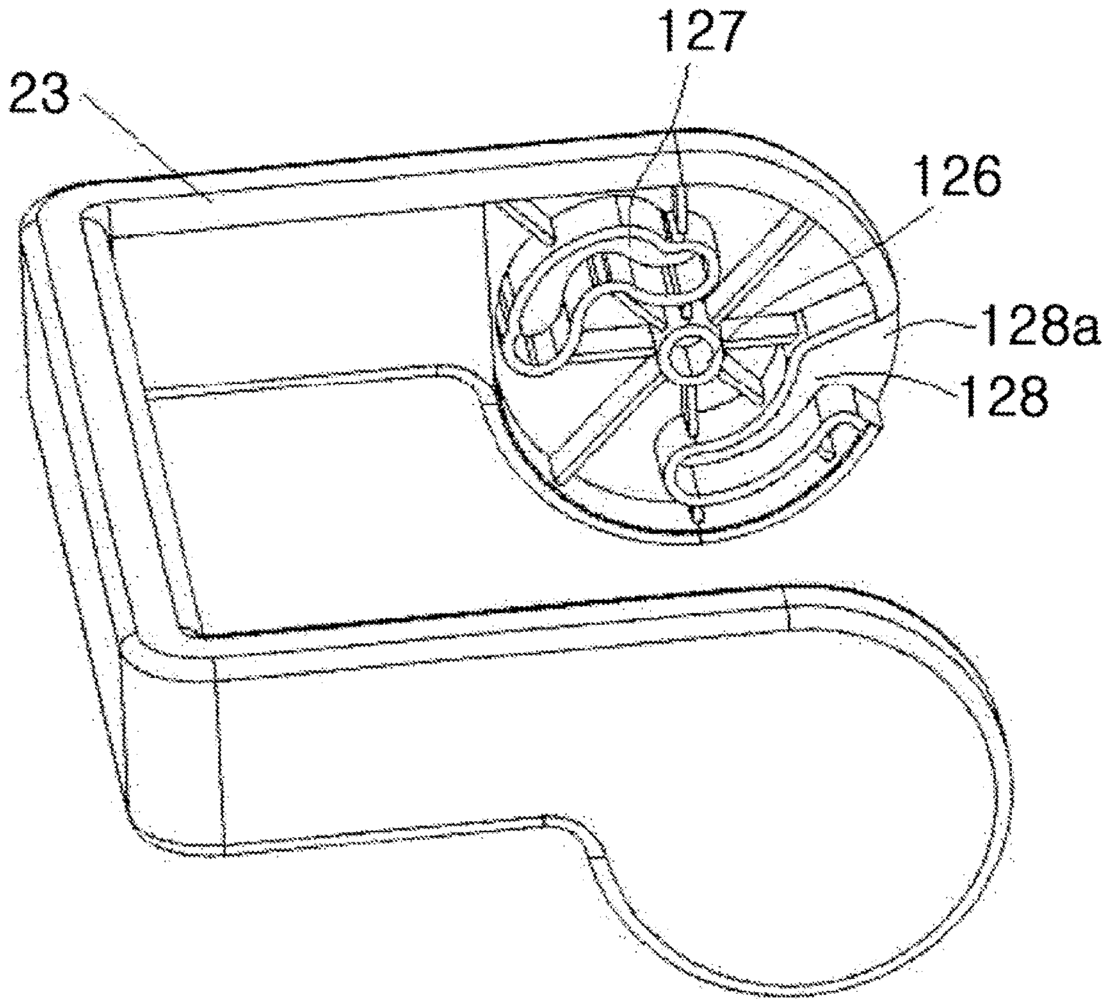
FIG. 13 is a perspective view illustrating a handle of the cover member illustrated in FIG. 12.

As illustrated in FIG. 13, the handle 23 has a '⊔' shape, center grooves 126 are formed in inner surfaces at two opposite ends of the handle 23, and rotary shafts protruding from outer surfaces of the cover member 20 are inserted into the center grooves, such that the handle is rotatable about the center grooves. In addition, a guide groove 128 is formed outside the center groove 126, and the horizontal fixing shaft 44 of the locking member 45 installed on the upper surface of the support plate 56 is inserted into the guide groove 128. When the handle 23 rotates upward and vertically stands, the guide groove 128 is partially opened (128*a*) so that the horizontal fixing shaft 44 may be separated downward. When the handle 23 rotates downward, the horizontal fixing shaft 44 is fixed so as not to be separated. Further, non-described reference numeral 127 indicates a guide groove into which a separate guide pin is inserted, and the guide pin guides the handle 23 so that the handle 23 smoothly rotates.

Figure 14:
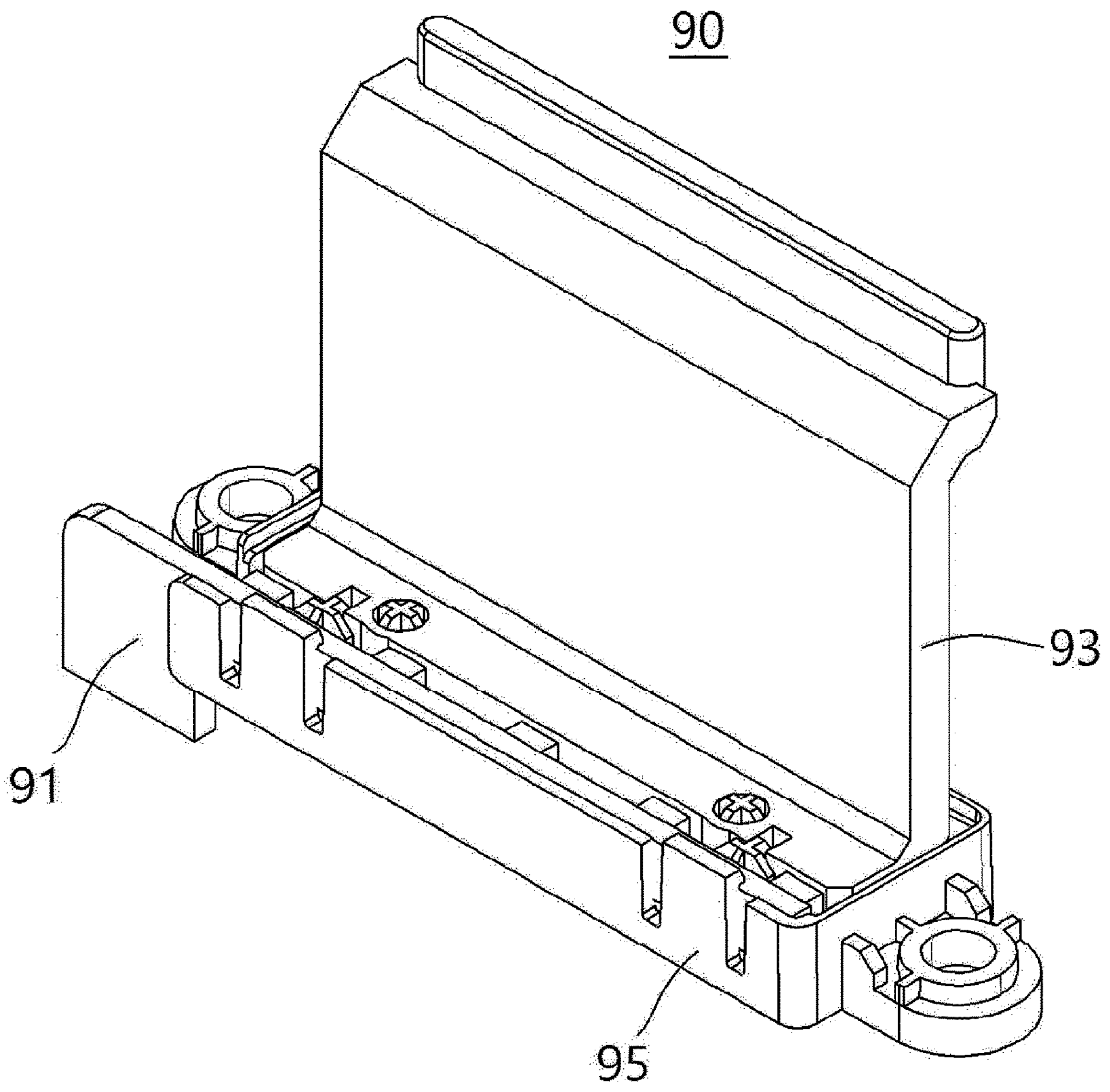
FIGS. 14 and 15 are perspective views illustrating one example of an LED display unit according to the present disclosure.
Figure 15:
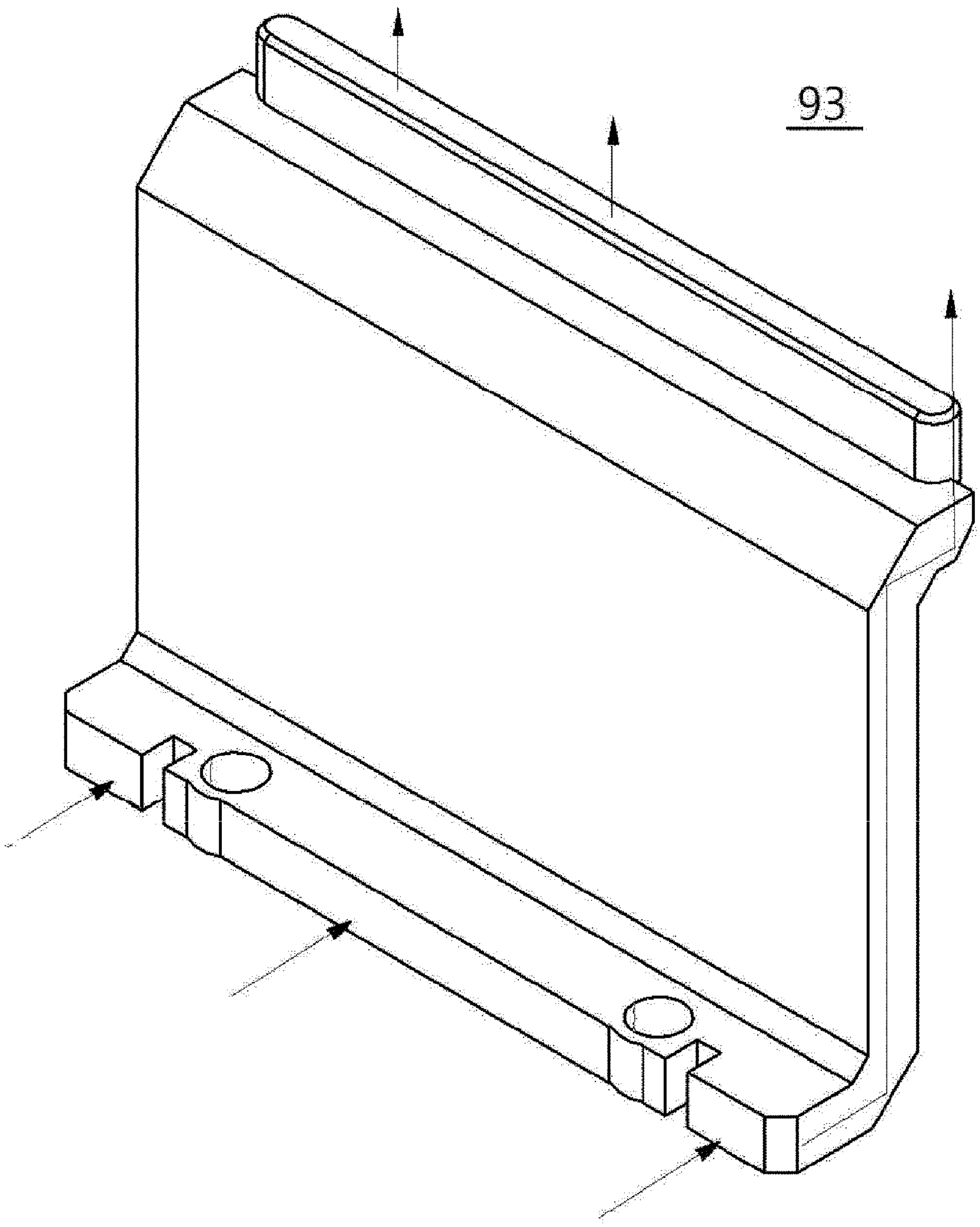

FIGS. 14 and 15 are perspective views illustrating one example of the LED display unit 90 according to the present disclosure. As illustrated, the LED display unit 90 serves to transfer an operating state of the PCR module to the upper surface of the cover member 20 and includes: an LED board 91 connected to a printed circuit board provided in the cover member 20, the LED board 91 having a plurality of LEDs arranged thereon; a light guide plate 93 configured to transmit upward light radiated from the LED board 91; and a base 95 configured to couple the LED board 91 and a lower end of the light guide plate 93 and fix the LED board 91 and the light guide plate 93 to the bottom surface of the cover member 20. In particular, the light guide plate 93 is made of a transparent material and has at least four reflective surfaces inclined at an angle of 45°. The light guide plate reflects upward the light, which horizontally enters the light guide plate from the lower end thereof, so that the light is vertically radiated from the upper surface of the cover member 20.

Figure 16:
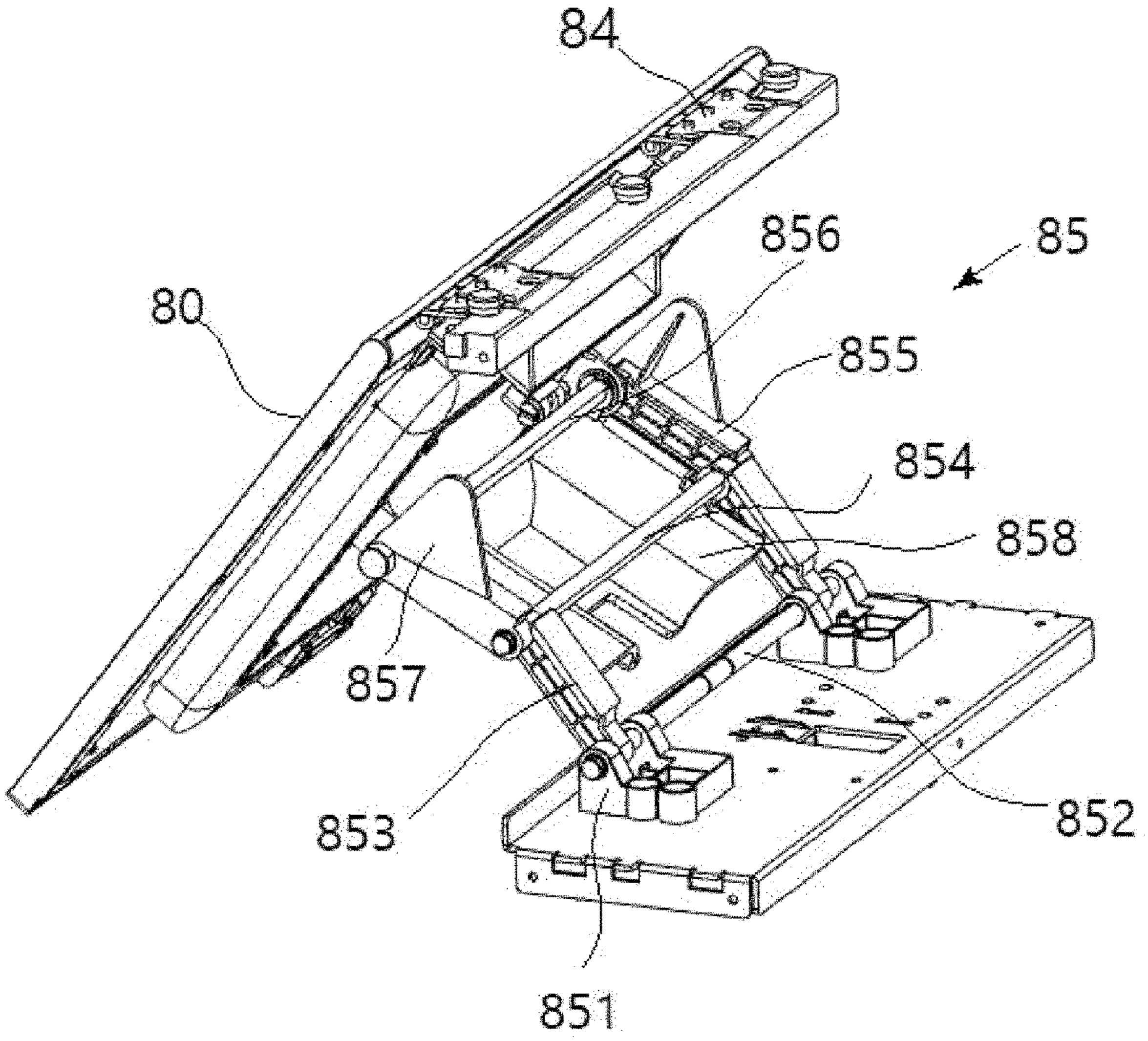
FIG. 16 is a perspective view illustrating an exemplary embodiment of a link member configured to support a display panel according to the present disclosure.

FIG. 16 is a perspective view illustrating an exemplary embodiment of a link member 84 configured to support the display panel according to the present disclosure. As illustrated, the link member 85 includes: two fixing blocks 851 fixed to a bottom of the main body housing 10 and spaced apart from one another at predetermined intervals; two lower link members 853 installed on a lower horizontal fixing shaft 852 horizontally penetrating the two fixing blocks 851 and configured to be rotatable upward or downward; two upper link members 855 installed on an intermediate horizontal fixing shaft 854 horizontally penetrating upper ends of the two lower link members 853 and configured to be rotatable upward or downward; and two fixing brackets 857 installed on an upper end horizontal fixing shaft 856 horizontally penetrating upper ends of the two upper link members 855 and configured to be rotatable upward or downward, the two fixing brackets 857 being fixed to a rear surface of the display panel 80.

In addition, a front cover plate 858 having a predetermined size is installed on a front surface of the upper link member 855 and closes the opening portion.

Because the modular simultaneous diagnosis PCR system 1 according to the present disclosure has the plurality of seating grooves 12 provided in the upper surface of the main body housing 10 as described above, the biochips 40 may be respectively seated in the plurality of seating grooves 12 after the plurality of seating grooves 12 is opened as the plurality of cover members 20 rotates upward. Further, when the biochip 40 is seated, the cover member 20 rotates downward. In this case, when the handle 23 of the cover member 20 rotates downward, the cover member 20 is fixed by the locking member 45.

Next, the control module 30 installed in the main body housing 10 performs the PCR process on the plurality of biochips 40 by controlling the plurality of heating/cooling modules 50, the plurality of light source modules 60, and the plurality of detection modules 70. Further, the display panel 80 displays the procedure of the PCR process and the process result.

Although preferred examples of the present disclosure have been described in detail hereinabove, the right scope of the present disclosure is not limited thereto, and many variations and modifications of those skilled in the art using the basic concept of the present disclosure, which is defined in the following claims, will also belong to the right scope of the present disclosure.

What is claimed is:

1. A modular simultaneous diagnosis PCR system comprising:

a main body housing configured to define an external appearance and having an internal space having a predetermined size;

a plurality of seating grooves concavely formed in an upper surface of the main body housing so that a plurality of biochips is seated in the plurality of seating grooves;

a plurality of heating/cooling modules installed in the main body housing and positioned below the plurality of seating grooves, the plurality of heating/cooling modules being configured to heat or cool the biochips;

a plurality of light source modules installed in the main body housing and positioned at lateral sides of the plurality of seating grooves, the plurality of light source modules being configured to emit light to lateral surfaces of the biochips; and a plurality of cover members installed on the upper surface of the main body housing and configured to be rotatable upward or downward to cover the plurality of seating grooves, wherein the upper surface of the main body housing has a stepped portion having a predetermined height and formed at a center of the upper surface of the main body housing so that the upper surface of the main body housing has a stair shape, wherein a lower end upper plate is installed at a front side of the stepped portion and an upper end upper plate is installed at a rear side of the stepped portion, wherein a display panel configured to display an operating state of the PCR module is installed on a front surface of the main body housing and configured to be rotatable upward or downward, wherein a single control module configured to control the PCR module is installed in the main body housing, wherein each cover member comprises:

a casing rotatably installed on a corresponding lower end upper plate or upper end upper plate of the main body housing and having an internal space having a predetermined size, the casing having a through portion formed in a bottom plate and corresponding to the seating groove;

a rotary member installed at a rear side of the casing so that the casing is rotatable upward or downward;

a handle installed to surround the front surface and a part of each of the lateral surfaces of the casing so that the casing is rotatable about the rotary member;

a detection module installed above the through portion and configured to measure fluorescence emitted from the biochip seated in the seating groove; and an LED display unit installed vertically forward of the through portion and configured to transmit an operating state of the PCR module to the upper surface of the cover member through light, wherein the control module is installed to be accommodated while sliding forward or rearward through an opening formed in a rear plate formed in the main body housing, and wherein the control module is electrically connected to the plurality of heating/cooling modules, the light source modules, the detection modules, the LED display unit, and the display panel and control the plurality of heating/cooling modules, the light source modules, the detection modules, the LED display unit, and the display panel.

2. The modular simultaneous diagnosis PCR system of claim 1, wherein a link member is configured to support the display panel so that the display panel is rotatable, wherein an opening portion having a predetermined size is formed in a front plate of the main body housing so that the link member enters or exits the main body housing.

3. The modular simultaneous diagnosis PCR system of claim 1, wherein a plurality of opening portions is formed in an upper plate of the main body housing and corresponds to the plurality of seating grooves, wherein a seating plate is installed on a lower portion of each opening portion and has a through-hole formed at a center of the seating plate to define a corresponding seating groove, wherein a support plate is configured to support each heating/cooling module and fixedly installed on a lower portion of the seating plate, wherein a rotary member is vertically installed on an upper surface of a rear end of the support plate and configured to support the cover member so that the cover member is rotatable upward or downward, wherein horizontal fixing shafts are installed on left and right upper surfaces of the support plate and configured to fix the cover members, and wherein each light source module is installed on the seating plate and positioned at the lateral side of the seating groove.

4. The modular simultaneous diagnosis PCR system of claim 1, wherein the LED display unit comprises:

an LED board having a plurality of LEDs horizontally arranged;

a light guide plate having at least four reflective surfaces inclined at an angle of 45°, made of a transparent material, and configured to transmit light radiated from the LED board upward, through the plurality of reflective surfaces; and a base configured to support the LED board and the light guide plate and fix the LED board and the light guide plate to a bottom surface of the cover member.

5. The modular simultaneous diagnosis PCR system of claim 3, wherein center grooves are formed in inner surfaces of two opposite ends of the handle, and rotary shafts protrude from an outer surface of the cover member and are inserted into the center grooves, such that the handle is rotatable about the center grooves, wherein the horizontal fixing shafts are installed on an upper surface of the support plate, protrude to the upper surface of the main body housing, and are inserted into and moved in guide grooves, wherein the guide grooves are opened downward when the handle rotates upward and vertically stands, and wherein the guide grooves perform a locking function of fixing the horizontal fixing shafts so that the horizontal fixing shafts are not separated when the handle rotates downward and lies horizontally.

* * * * *